United States Patent
Patterson et al.

(10) Patent No.: US 6,865,871 B2
(45) Date of Patent: Mar. 15, 2005

(54) CROP FEED ARRANGEMENT FOR THE HEADER OF A COMBINE HARVESTER

(75) Inventors: Roger L. Patterson, Selkirk (CA); Bruce Robert Kidd, Winnipeg (CA)

(73) Assignee: MacDon Industries Ltd., Winnipeg (CA)

( * ) Notice: Subject to any disclaimer, the term of this patent is extended or adjusted under 35 U.S.C. 154(b) by 0 days.

(21) Appl. No.: 10/618,070

(22) Filed: Jul. 14, 2003

(65) Prior Publication Data
US 2005/0016147 A1   Jan. 27, 2005

(51) Int. Cl.⁷ ............................................ A01D 43/00
(52) U.S. Cl. ........................................ 56/181; 56/14.5
(58) Field of Search ........................ 56/14.5, 181, 182, 56/183, 184, 185, 186, 187, 189, 191

(56) References Cited

U.S. PATENT DOCUMENTS

| | | | |
|---|---|---|---|
| 885,157 A * | 4/1908 | Hovland ...................... 56/14.5 |
| 2,389,193 A * | 11/1945 | Graves ........................ 198/601 |
| 2,999,348 A * | 9/1961 | Cunningham ............ 56/16.4 R |
| 4,956,966 A | 9/1990 | Patterson |
| 5,005,343 A | 4/1991 | Patterson |
| 5,464,371 A | 11/1995 | Honey |
| 5,784,869 A * | 7/1998 | Rayfield ........................ 56/119 |
| 6,202,397 B1 * | 3/2001 | Watts et al. .................. 56/208 |
| 6,318,058 B1 * | 11/2001 | Emmert ....................... 56/14.6 |

OTHER PUBLICATIONS

Brochure—by Midwest Fabrication.

* cited by examiner

*Primary Examiner*—Robert E. Pezzuto
*Assistant Examiner*—Nathan Mammen
(74) *Attorney, Agent, or Firm*—Adrian D. Battison; Michael R. Williams; Ryan W. Dupuis

(57) ABSTRACT

A draper header for a combine harvester includes two side drapers each running from an outer end guide roller at a first end of the header to an inner end guide roller adjacent the discharge location of the header and a central feed draper located at the discharge location and including a front guide roller just behind the cutter bar and running to a rear guide roller in front of the feeder house of the combine harvester. An auger is located between the discharge rollers with a front edge of the flight forward of the rear end of the discharge rollers to feed the material inwardly and underneath the auger to the inlet of the feeder house. A pan is located underneath the auger and is mounted on a common structure with the feed draper for common pivotal movement about a transverse horizontal axis.

13 Claims, 4 Drawing Sheets

CROP FEED ARRANGEMENT FOR THE HEADER OF A COMBINE HARVESTER

This invention relates to a crop feed arrangement for the header of a combine harvester.

BACKGROUND OF THE INVENTION

A header for a crop harvesting machine generally comprises a main longitudinal support member in the form of an elongate tube which extends across substantially the full width of the header frame and defines a main structural member for the header frame. The tube carries a plurality of forwardly and downwardly extending support beams which include a first portion extending downwardly and a second portion attached to a lower end of the first portion and extending forwardly therefrom toward a forward end of the support beams. The cutter bar is attached to the forward end of the support beams and is thus held thereby in a position generally parallel to the main support tube.

In U.S. Pat. No. 4,956,966 issued September 1990 and U.S. Pat. No. 5,005,343 issued April 1991 by Patterson and assigned to the present Assignee is disclosed a header which utilizes two side drapers to transport the crop cut by the knife inwardly along the header table to a central discharge opening. The side drapers discharge onto a central feed draper which has a front roller just behind the knife and a rear roller at the feeder house of a combine harvester so as to carry the crop from the side drapers rearwardly into the feeder house for inlet into the combine harvester for processing. A rotary feed member which may carry auger flight portions is mounted at the discharge opening of the header above the feed draper so as to assist in carrying bulky crop through the discharge opening so as to be carried into the feeder house. The feed draper is carried on the rear roller which is attached to a feeder house and therefore the feed draper and its associated underlying pan flex and twist as the header floats relative to the feeder house.

While this arrangement has achieved considerable commercial success, it is desirable to improve the feed of the crop material from the side drapers into the feeder house particularly in relation to bulky crops such as soy beans.

A subsequent U.S. patent which is U.S. Pat. No. 5,464,371 issued November 1995 by Honey discloses a similar arrangement in which the crop is transferred from the rear end of the feed draper into a rigid fixed adapter housing which is mounted on the front of the feeder house and contains the rotary feed member in the form of an auger with conventional feeding fingers. This arrangement therefore requires that the header is moved forwardly relative to the feeder house so as to provide the space necessary for the adapter housing and its rotary feed member contained therein.

Further commercial devices are manufactured by Deere and Company and Agco but it is believed that there are no patents disclosing the construction of these devices.

Attention is directed to related application Ser. No. 10/617,889, filed Jul. 14, 2003, filed simultaneously with this application which discloses an improved construction of the feed draper used herein which allows the front draper roller to be moved as far forward as possible in the area underneath the side drapers, the disclosure of which is incorporated herein by reference.

SUMMARY OF THE INVENTION

It is one object of the present invention to provide a header in which the system for transfer of crop from the side drapers to the feeder house is improved.

According to the invention there is provided a crop harvesting header for a combine harvester comprising:
a main frame structure extending across between two ends of the header across a width of the header for movement in a direction generally at right angles to the width across ground including a crop to be harvested;
a mounting assembly for attachment to a feeder house of the combine harvester for carrying the main frame structure on the combine harvester;
a crop receiving table carried on the main frame structure across the width of the header;
a cutter bar across a front of the table carrying a cutter knife operable for cutting the crop as the header is moved forwardly across the ground for depositing the crop onto the table;
and a crop transport system for moving the cut crop toward a discharge location of the header for feeding the crop into a feed opening of the combine harvester;
the crop transport system including:
a first side draper having an outer end guide roller at a first end of the header, an inner end guide roller adjacent the discharge location and a continuous draper canvas wrapped around the outer and inner guide rollers to define a top run of the canvas for carrying the cut crop from the knife across the header to a discharge end adjacent the discharge location;
a second side draper having an outer end guide roller at a second end of the header, an inner end guide roller adjacent the discharge location and a continuous draper canvas wrapped around the outer and inner guide rollers to define a top run of the canvas for carrying the cut crop from the knife across the header to a discharge end adjacent the discharge location;
a feed draper located at the discharge location and including a front guide roller adjacent the cutter bar, a rear guide roller behind the front guide roller and a draper canvas wrapped around the front and rear guide rollers to define a top run of the feed draper for receiving the crop material from the discharge ends of the first and second side drapers and for carrying the crop material rearwardly toward the feed opening of the combine harvester; and
and a rotary feed member at the discharge location arranged such that the crop is fed underneath the rotary feed member to the inlet opening of the combine harvester;
the rotary feed member being mounted on a mounting assembly for upward and downward movement within the discharge location;
the rotary feed member having a length between ends thereof which is less than the spacing between the side drapers;
the rotary feed member having each of the ends thereof located inwardly of the respective side draper such that the rotary feed member when moved downwardly on its mounting assembly to a lowermost position has at least part of its periphery between the inner ends of the side drapers;
and the rotary feed member being arranged to extend to a forward edge at a position forwardly of a rear of the side drapers.

Preferably the header includes generally upstanding rear sheets behind the side drapers and including a central opening in the rear sheets for allowing the crop to pass to the inlet of the combine harvester and wherein the rotary feed member projects to a position forwardly of the rear sheets through the opening.

Preferably the rotary feed member is mounted on pivotal support members arranged to be carried on the mounting assembly which is fixed relative to the inlet of the feeder house of the combine harvester such that the rotary feed member can pivot to accommodate changes in volume of the crop while moving in an arc which is at a predetermined location relative to the inlet.

Preferably there is provided a stationary pan underneath the rotary feed member such that the rotary feed member carries the crop over the pan to the inlet of the combine harvester, the pan having a front edge adjacent the rear roller of the feed draper to receive crop material therefrom. However the draper in an alternative arrangement may extend underneath and cooperate with the rotary feed member and the pan be omitted.

Preferably the pan and the feed draper are mounted on a common support assembly, which support assembly is mounted for pivotal movement about a horizontal axis at the rear of the pan relative to the mounting assembly and thus relative to the inlet of the combine harvester.

Preferably the support assembly comprises a pair of arms each at a respective side of the feed draper and each extending to a forward end carried on the header adjacent the cutter bar.

Preferably the feed draper is wider than the distance between the inner ends of the side drapers and is located underneath the side drapers.

According to a second aspect of the invention there is provided a crop harvesting header for a combine harvester comprising:

- a main frame structure extending across between two ends of the header across a width of the header for movement in a direction generally at right angles to the width across ground including a crop to be harvested;
- a mounting assembly for attachment to a feeder house of the combine harvester for carrying the main frame structure on the combine harvester;
- a crop receiving table carried on the main frame structure across the width of the header;
- a cutter bar across a front of the table carrying a cutter knife operable for cutting the crop as the header is moved forwardly across the ground for depositing the crop onto the table;
- and a crop transport system for moving the cut crop toward a discharge location of the header and for feeding the crop into a feed opening of the combine harvester;
- the crop transport system including:
- a first side draper having an outer end guide roller at a first end of the header, an inner end guide roller adjacent the discharge location and a continuous draper canvas wrapped around the outer and inner guide rollers to define a top run of the canvas for carrying the cut crop from the knife across the header to a discharge end adjacent the discharge location;
- a second side draper having an outer end guide roller at a second end of the header, an inner end guide roller adjacent the discharge location and a continuous draper canvas wrapped around the outer and inner guide rollers to define a top run of the canvas for carrying the cut crop from the knife across the header to a discharge end adjacent the discharge location;
- a feed draper located at the discharge location and including a front guide roller adjacent the cutter bar, a rear guide roller behind the front guide roller and a draper canvas wrapped around the front and rear guide rollers to define a top run of the feed draper for receiving the crop material from the discharge ends of the first and second side drapers and for carrying the crop material rearwardly toward the feed opening of the combine harvester; and
- a rotary feed member at the discharge location arranged such that the crop is fed underneath the rotary feed member to the inlet opening of the combine harvester;
- a stationary pan underneath the rotary feed member such that the rotary feed member carries the crop over the pan to the inlet of the combine harvester, the pan having a front edge adjacent the rear roller of the feed draper to receive crop material therefrom;
- wherein the pan and the feed draper are mounted on a common support assembly, which support assembly is mounted for pivotal movement about a horizontal axis at the rear of the pan relative to the mounting assembly and thus relative to the inlet of the combine harvester.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
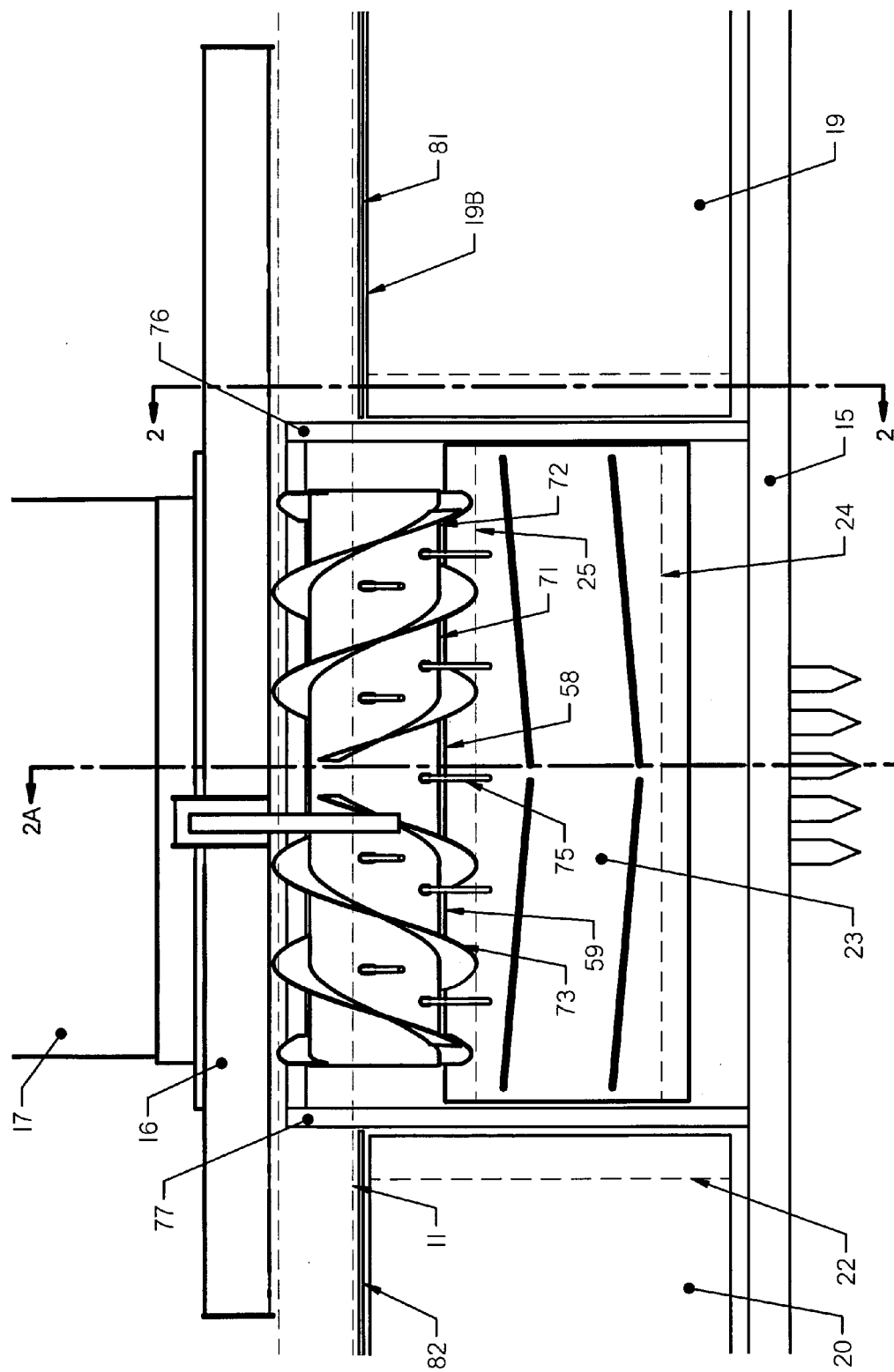
FIG. 1 is a top plan view of the center section only of a header according to the present invention with a number of elements such as the reel omitted for convenience of illustration.

The header shown in the figures comprises a main frame 10 including a horizontal main support beam 11 extending along the length of the header along a first end 12 to a second end 13 of the header. The main frame includes forwardly extending frame members 14 at the ends of the header together with similarly arranged frame members intermediate the width of the header. At the front end of the frame members is mounted a cutter bar 15 which carries a sickle knife construction of a conventional nature. The frame 10 is attached to an adapter structure 16 attached to the feeder house 17 of a combine harvester 18.

The header includes a crop transportation system for transferring the crop from the sickle knife to the feeder house. This includes two side drapers 19 and 20 each of which includes a canvas extending from an outer guide roller 21 to an inner guide roller 22 so as to define an upper run of the canvas which carries the crop inwardly toward the center of the header. The canvas of the drapers 19 and 20 carries a plurality of transverse slats 19A.

At the center of the header is provided a feed draper 23 which has a front roller 24 just behind the cutter bar and a rear roller 25 thus defining an upper run of the canvas which carries the crop rearwardly toward the feeder house. The draper 23 carries slats 23A.

Headers of the general type described above are well known and the area with which the present invention is concerned is that of the feed section at the center of the header which carries the crop from the inner ends of the side drapers into the feeder house.

Figure 2:
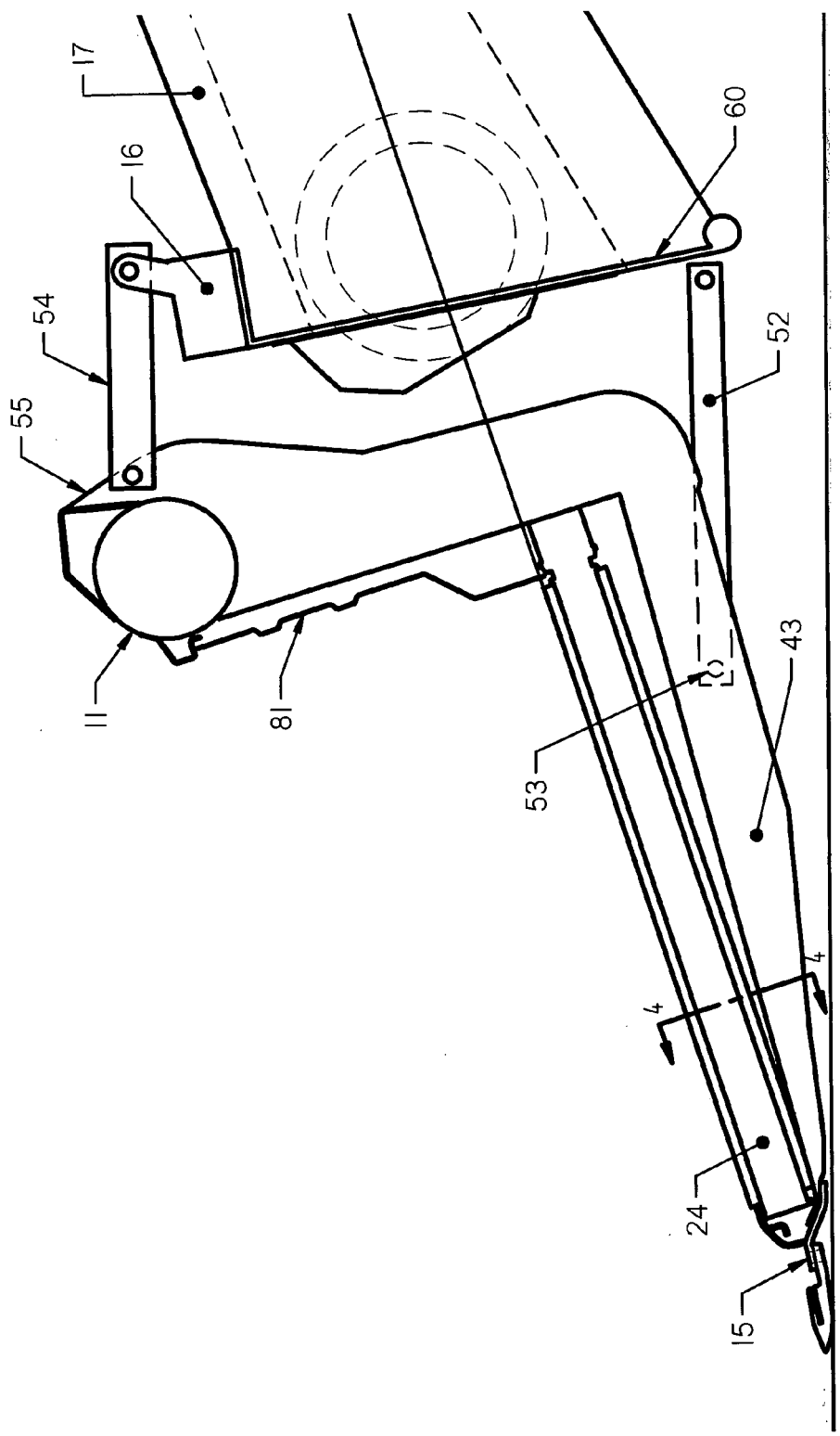
FIG. 2 is a cross sectional view along the lines 2—2 of the header of FIG. 1.
Figure 2A:
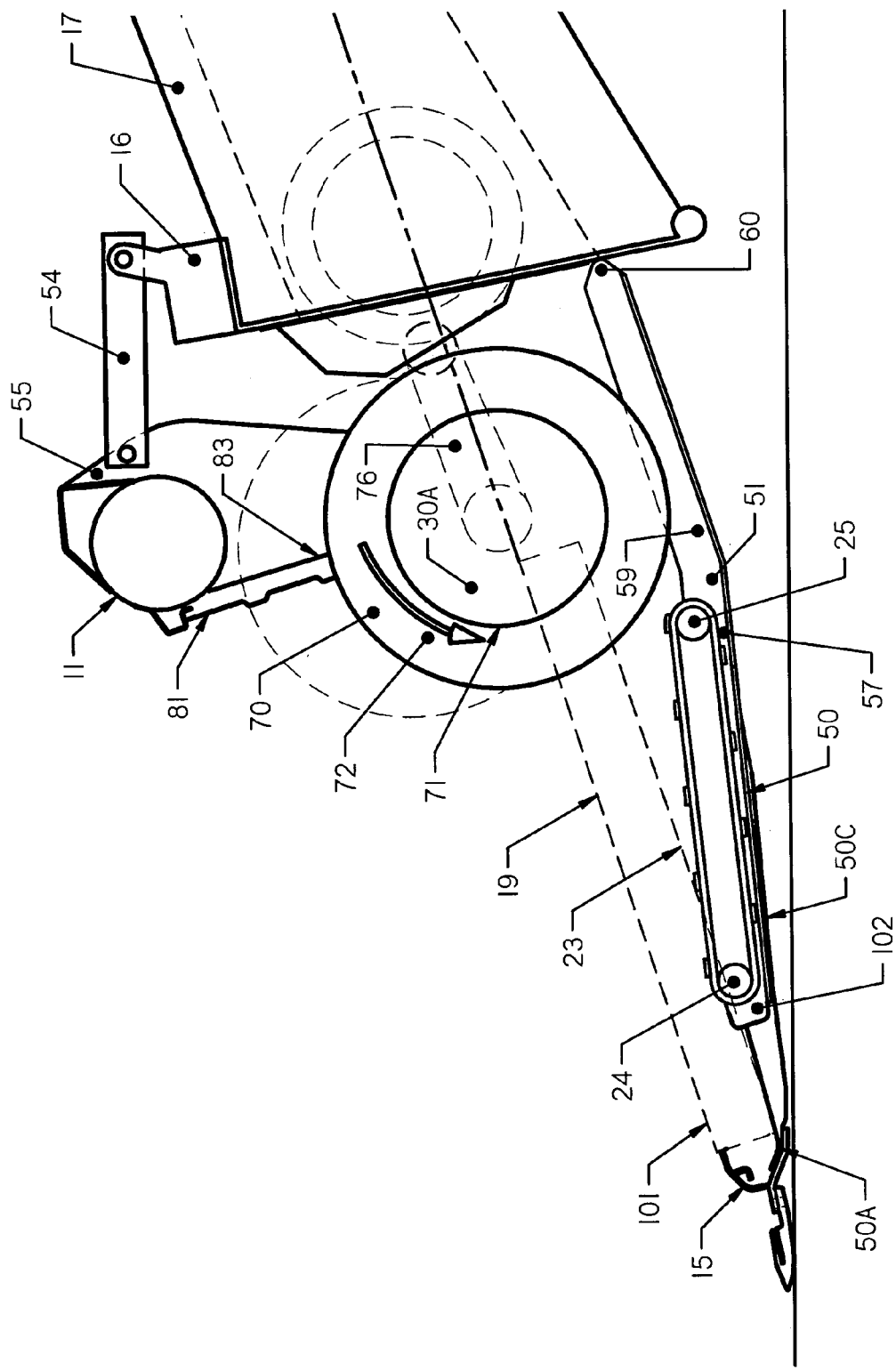
FIG. 2A is a cross sectional view along the lines 2A—2A of the header of FIG. 1.
Figure 3:
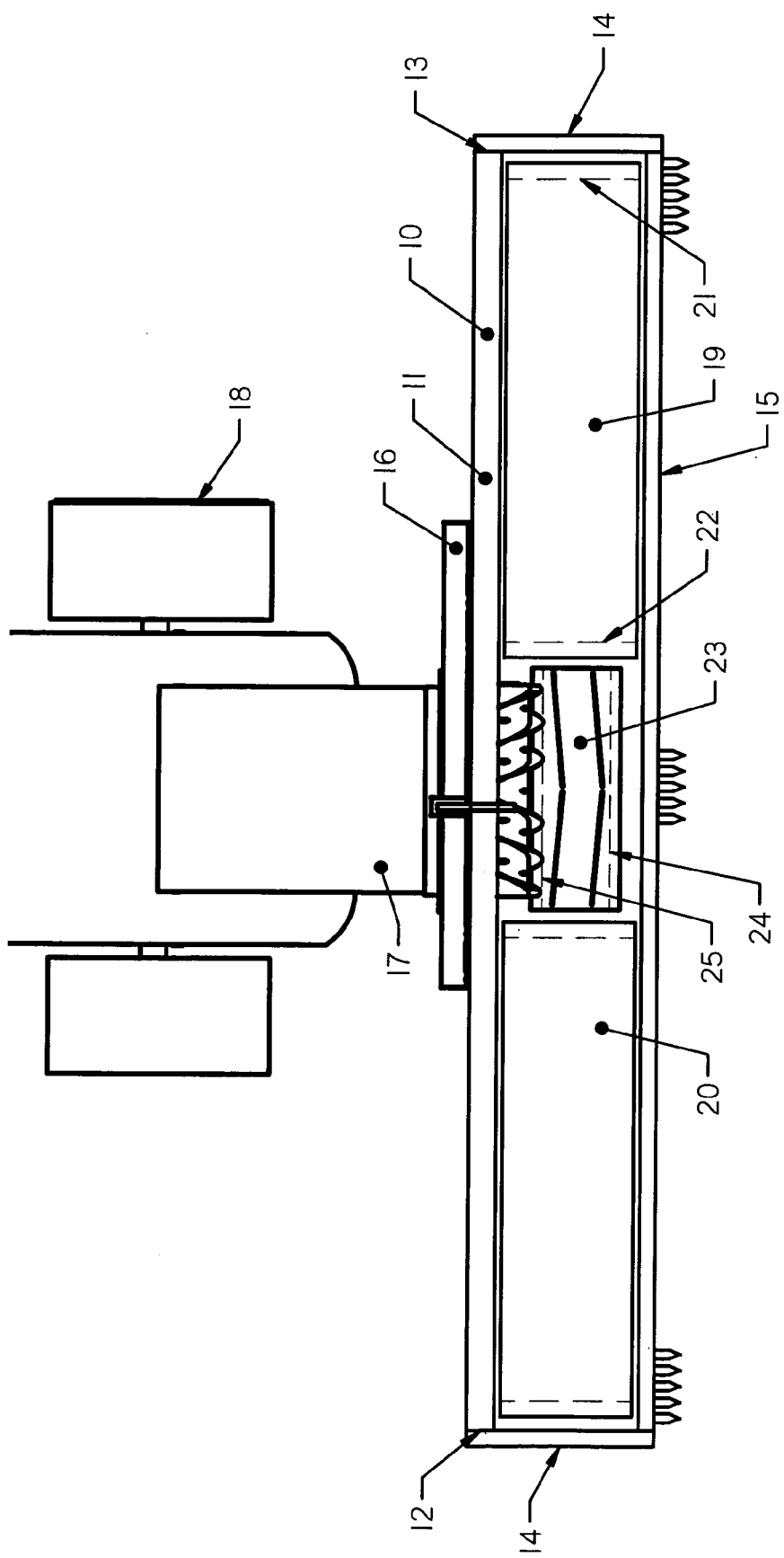
FIG. 3 is a top plan view of the complete header of FIG. 1 with a number of elements such as the reel omitted for convenience of illustration.

Turning now to FIGS. 2 and 2A, it will be noted that the front roller 24 of the feed draper 23 is carried on a support rearward of the cutter bar 15 so that it is fixed to the forward edge of the header. The rear roller 25 is carried on a bracket 57. Underneath the feed draper is mounted a pan member 50 which extends from the header at a forward end 50A at the cutter bar 15 at the front of and inwardly of the support frame member 43 rearwardly to a rear end 51.

The header including the main beam 11 and the frame element 43 is carried on the support frame 16 by two bottom links 52 which extend forwardly from the frame 16 under the header frame within a respective one of the arms 43 and support the header frame at a forward end 53 of the links 52. The links are supported on mounting springs (not shown). A top support link 54 extends forwardly from the frame 16 to a bracket 55 at the beam 11. Thus the header can move upwardly and downwardly in a floating action and can also twist side to side about a generally horizontal forwardly extending axis by a differential in the lifting of the links 52.

Immediately behind the rear end of the draper 23 is provided a forward end 58 of a guide sheet 59 which extends from the rear end of the draper 23 rearwardly to a rear end 60 at the feeder house.

The feed draper 23 and the pan or guide sheet 59 are mounted on two parallel side arms which extend to a rear end 60 of the pan 59 at which point the arms are pivoted to the feeder house. The front end of each arm is supported by the cutter bar at the forward end 50A of the pan 50. The front roller 24 of the feed draper is mounted between the arms rearward of the cutter bar. The rear roller 25 is mounted between the arms rearward of the front roller. The pan 59 is mounted between the arms and extends from the rear feed draper roller to the front of the feeder house at the frame 16. It is necessary for the arms, draper and pan 59 to flex and pivot to accommodate the floating and pivoting action of the header. The rear roller 25 of the draper 23 is thus mounted on the arms and therefore also the draper 23 flexes and twists to accommodate such movement.

The pan 50 may comprise a removable cover 50C underneath the feed draper and the pan 59 both of which span the arms and thus define a common structure. Thus both the draper and the pan 59 pivot about the mounting at the rear end 60 at the frame 16.

The sheet 59 has a width substantially equal to the width of the draper 23 so that the material discharged from the draper across the full width of the draper is carried rearwardly over the sheet to the feeder house. The feed draper is preferably wider than the space between the side drapers so that the feed draper extends underneath the side drapers to carry the crop therefrom and to reduce the possibility of crop back feeding underneath the side drapers.

The movement of the crop material to the feeder house is assisted by a rotary feed member 70 carried above the sheet 59 with a width substantially equal to the width of the sheet 59. The rotary feed member 70 includes a drum 71 which carries on its outside surface two helical auger sections 72 and 73 arranged at respective ends of the drum and arranged so that rotation of the drum in a counter clockwise direction so as to carry the crop material underneath the rotary feed member across the sheet 59 causes the crop material at the side edges of the sheet to be drawn inwardly toward a center of the sheet. At the center of the drum 71 is provided a plurality of fingers or other projecting members as indicated at 75 which direct the crop material rearwardly to enter the feeder house 17. Thus it will be noted that the rotary feed member is wider than the feeder house. The rotary feed member has a length so that it fits just inside side drapers 19 and 20. The rotary feed member has a diameter so that its forward edge substantially directly overlies the rear edge of the feed draper and the forward edge of the sheet 59 so that it can pick up material from the rear of the draper and carry that material rearwardly. Thus the forward edge of the rotary feed member projects to a position forward of a rear edge 30A of a rear edge 19B of the draper.

The rotary feed member is located such that the outside edge of the helical flights thereof and the outer edge of the fingers thereof lie in a cylinder which is closely positioned to the rear end of the feed draper. This distance is preferably of the order of 50 mm or less since such a small distance reduces the possibility of crop back-feeding underneath the feed draper and ensures that the crop is stripped from the feed draper by the rotary feed member.

The rotary feed member is carried on two side arms 76 and 77 which are mounted at their rear end on a transverse shaft 78 carried on the frame 16. The shaft 78 is positioned just in front of the front feeder chain pulley 80 so that the position of the rotary feed member 70 is maintained substantially constant relative to the feeder chain as the rotary feed member pivots upwardly and downwardly on the shaft 78 to accommodate changes in thickness of the crop on top of the sheet 59.

The rear of the header is defined by two rear sheets 81 and 82 on respective sides of the header which define an opening 83 at the rotary feed member so that the rotary feed member projects through the opening to operate in co-operation with the sheet 59 in the area at the rear of the header and on top of the sheet 59. Thus the position of the rotary feed member is such that it is behind the front of the header and forward of the rear part of the header and sits intermediate the rear wall of the header. The header is thus moved as far back close to the frame 16 as is physically possible and this positioning of the header is not influenced by the location of the rotary feed member. In addition the rotary feed member is of a size so that it can cooperate with the sheet 59 in properly feeding the crop material into the feeder house. Stops may be provided to prevent the rotary feed member from engaging the sheet 59 which could cause damage. Thus the rotary feed member has each of the ends thereof located inwardly of the respective side draper such that the rotary feed member when moved downwardly on its mounting assembly to a lowermost position has at least part of its periphery between the inner ends of the side drapers as it extends closely adjacent the sheet 59. It is also located in a position so that it co-operates with a feeder chain at all times during its operation and during its movement.

The location of the pivot axis of the support arms at the rear end 60, that is behind the rotary feed member, rather than in front of the rotary feed member at the position between the draper and the pan, has the advantage that it reduces the effect of changes of angle of the support member on the feed direction of the crop toward the rotary feed member. Thus the crop is nearly at a tangent to the rotary feed member regardless of the height of the cutter bar, as the header floats, relative to the rotary feed member which remains at a common height with the feeder house.

However, it is not essential that the feed draper be mounted on a common pivotal support with the pan under the rotary feed member and, in an alternative arrangement (not shown) the pan can be fixed on the mounting 16 with the feeder house and the feed draper mounted in front of it on arms which pivot about a horizontal axis across the front of the pan.

In a further modified arrangement (not shown) in which the draper 23 can extend to the feeder house and the pan 59 is omitted. Thus in this case the rotary feed member 70 co-operates with the upper run of the draper in feeding the material into the feeder house.

The arrangement in which the rotary feed member is narrow enough to fit between the side drapers has the advantage that the rotary feed member can cooperate with the pan (or with the feed draper) in close proximity to provide an effective feeding action, but at the same time, the side drapers and the cutter bar can be moved rearwardly toward the feeder house. This has the advantages that it improves lines of sight from the cab to the cutter bar and table and also it reduces the amount cantilever of the header from the feeder house.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A crop harvesting header for a combine harvester comprising:

a main frame structure extending across between two ends of the header across a width of the header for movement in a direction generally at right angles to the width across ground including a crop to be harvested;

a mounting assembly for attachment to a feeder house of the combine harvester for carrying the main frame structure on the combine harvester;

a crop receiving table carried on the main frame structure across the width of the header;

a cutter bar across a front of the table carrying a cutter knife operable for cutting the crop as the header is moved forwardly across the ground for depositing the crop onto the table;

and a crop transport system for moving the cut crop toward a discharge location of the header for feeding the crop into a feed opening of the combine harvester;

the crop transport system including:

a first side draper having an outer end guide roller at a first end of the header, an inner end guide roller adjacent the discharge location and a continuous draper canvas wrapped around the outer and inner guide rollers to define a top run of the canvas for carrying the cut crop from the knife across the header to a discharge end adjacent the discharge location;

a second side draper having an outer end guide roller at a second end of the header, an inner end guide roller adjacent the discharge location and a continuous draper canvas wrapped around the outer and inner guide rollers to define a top run of the canvas for carrying the cut crop from the knife across the header to a discharge end adjacent the discharge location;

a feed draper located at the discharge location and including a front guide roller adjacent the cutter bar, a rear guide roller behind the front guide roller and a draper canvas wrapped around the front and rear guide rollers to define a top run of the feed draper for receiving the crop material from the discharge ends of the first and second side drapers and for carrying the crop material rearwardly toward the feed opening of the combine harvester; and and a rotary feed member at the discharge location arranged such that the crop is fed underneath the rotary feed member to the inlet opening of the combine harvester;

the rotary feed member being mounted on a mounting assembly for upward and downward movement within the discharge location;

the rotary feed member having a length between ends thereof which is less than the spacing between the side drapers;

the rotary feed member having each of the ends thereof located inwardly of the respective side draper such that the rotary feed member when moved downwardly on its mounting assembly to a lowermost position has at least part of its periphery between the inner ends of the side drapers;

and the rotary feed member being arranged to extend to a forward edge at a position forwardly of a rear of the side drapers.

2. The header according to claim 1 wherein the header includes generally upstanding rear sheets behind the side drapers and including a central opening in the rear sheets for allowing the crop to pass to the inlet of the combine harvester and wherein the rotary feed member projects to a position forwardly of the rear sheets through the opening.

3. The header according to claim 1 wherein the feed draper is wider than the distance between the inner ends of the side drapers and is located underneath the side drapers.

4. The header according to claim 1 wherein the rotary feed member has an outer surface which is spaced from the rear end of the feed draper by a distance which is less than or equal to 50 mm.

5. The header according to claim 1 wherein the rotary feed member is mounted on pivotal support members arranged to be carried on the mounting assembly which is fixed relative to the inlet of the feeder house of the combine harvester such that the rotary feed member can pivot to accommodate changes in volume of the crop while moving in an arc which is at a predetermined location relative to the inlet.

6. The header according to claim 1 wherein there is provided a stationary pan underneath the rotary feed member such that the rotary feed member carries the crop over the pan to the inlet of the combine harvester, the pan having a front edge adjacent the rear roller of the feed draper to receive crop material therefrom.

7. The header according to claim 1 wherein the pan and the feed draper are mounted on a common support assembly, which support assembly is mounted for pivotal movement about a horizontal axis at the rear of the pan relative to the mounting assembly and thus relative to the inlet of the combine harvester.

8. The header according to claim 7 wherein the support assembly comprises a pair of arms each at a respective side of the feed draper and each extending to a forward end carried on the header adjacent the cutter bar.

9. A crop harvesting header for a combine harvester comprising:

a main frame structure extending across between two ends of the header across a width of the header for movement in a direction generally at right angles to the width across ground including a crop to be harvested;

a mounting assembly for attachment to a feeder house of the combine harvester for carrying the main frame structure on the combine harvester;

a crop receiving table carried on the main frame structure across the width of the header;

a cutter bar across a front of the table carrying a cutter knife operable for cutting the crop as the header is moved forwardly across the ground for depositing the crop onto the table;

and a crop transport system for moving the cut crop toward a discharge location of the header and for feeding the crop into a feed opening of the combine harvester;

the crop transport system including:

a first side draper having an outer end guide roller at a first end of the header, an inner end guide roller adjacent the discharge location and a continuous draper canvas wrapped around the outer and inner guide rollers to define a top run of the canvas for carrying the cut crop from the knife across the header to a discharge end adjacent the discharge location;

a second side draper having an outer end guide roller at a second end of the header, an inner end guide roller adjacent the discharge location and a continuous draper canvas wrapped around the outer and inner guide rollers to define a top run of the canvas for carrying the cut crop from the knife across the header to a discharge end adjacent the discharge location;

a feed draper located at the discharge location and including a front guide roller adjacent the cutter bar, a rear guide roller behind the front guide roller and a draper canvas wrapped around the front and rear guide rollers to define a top run of the feed draper for receiving the crop material from the discharge ends of the first and second side drapers and for carrying the crop material rearwardly toward the feed opening of the combine harvester; and a rotary feed member at the discharge location arranged such that the crop is fed underneath the rotary feed member to the inlet opening of the combine harvester;

a stationary pan underneath the rotary feed member such that the rotary feed member carries the crop over the pan to the inlet of the combine harvester, the pan having a front edge adjacent the rear roller of the feed draper to receive crop material therefrom;

wherein the pan and the feed draper are mounted on a common support assembly, which support assembly is mounted for pivotal movement about a horizontal axis at the rear of the pan relative to the mounting assembly and thus relative to the inlet of the combine harvester.

10. The header according to claim 9 wherein the feed draper is wider than the distance between the inner ends of the side drapers and is located underneath the side drapers.

11. The header according to claim 9 wherein the rotary feed member has an outer surface which is spaced from the rear end of the feed draper by a distance which is less than or equal to 50 mm.

12. The header according to claim 9 wherein the support assembly comprises a pair of arms each at a respective side of the feed draper and each extending to a forward end carried on the header adjacent the cutter bar.

13. The header according to claim 9 wherein the rotary feed member is mounted on pivotal support members arranged to be carried on the mounting assembly which is fixed relative to the inlet of the feeder house of the combine harvester such that the rotary feed member can pivot to accommodate changes in volume of the crop while moving in an arc which is at a predetermined location relative to the inlet.

* * * * *